C. E. LINEBARGER.
BATTERY TEMPERATURE CONTROLLER.
APPLICATION FILED MAR. 17, 1919.
1,424,731. Patented Aug. 1, 1922.
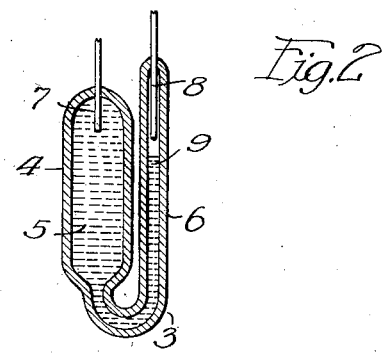
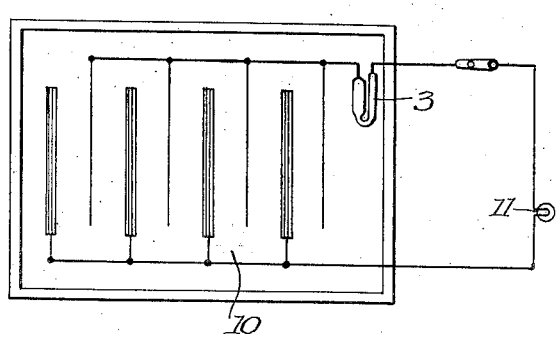
Witness:
L. W. Novander
Inventor
Charles E. Linebarger
By E. J. Andrews
atty

UNITED STATES PATENT OFFICE.

CHARLES E. LINEBARGER, OF CHICAGO, ILLINOIS.

BATTERY-TEMPERATURE CONTROLLER.

1,424,731.  Specification of Letters Patent.  Patented Aug. 1, 1922.

Application filed March 17, 1919. Serial No. 283,187.

*To all whom it may concern:*

Be it known that I, CHARLES E. LINEBARGER, a citizen of the United States, residing at 4315 Kenmore Avenue, Chicago, in the county of Cook and State of Illinois, have invented a new and useful Improvement in Battery-Temperature Controllers, of which the following is a specification.

My invention relates to means for preventing the overheating of electric batteries when in use, and particularly to storage batteries used on motor driven vehicles, either when the batteries are in use or when they are being charged.

The following facts known to electricians form a basis for the invention: Continued passing of an electric current from a generator through a storage battery raises the temperature of the latter, particularly after it has been fully charged. Temperatures above 110° Fahrenheit are injurious to storage batteries. The action of a storage battery is progressively lessened as its temperature is lowered. And a discharge of a storage battery cools it.

The invention consists of a thermostatic device the temperature of which is controlled by the temperature of the battery; the device being so set and arranged that when its temperature arrives at a predetermined point, an electric circuit is closed through the thermostat, the battery, and also through a resistance such as that of lamps, or a coil of wire.

Of the accompanying drawings, Fig. 1 is a more or less diagrammatic view of a combination of a storage battery, an electric circuit and a circuit making device, which embody the features of my invention; and Fig. 2 is a central section of the circuit making device.

The switch, or circuit maker, or thermostat 3, comprises a glass U tube, with one large arm 4 full of mercury 5, and the other arm 6 having a much smaller cross section, and being partly full of mercury, and preferably with a gas filling the adjacent space, so that the mercury normally cannot come in contact with the wire 8 even though the thermostat is inverted. Each arm has an electric wire 7 or 8 projecting into the bore of the arm. The wire 7 in the larger arm projects into the mercury; but the wire 8 in the other arm normally does not extend to the mercury, but it is of such a length that when the mercury reaches a predetermined temperature it will expand until the portion 9 comes into contact with the end of the wire 8. The device is preferably mounted in one of the cells of the battery 10; but it is necessary only to place it adjacent the walls of the battery if preferred.

The operation of the device is as follows: The wires 7 and 8 are connected in a circuit with the high resistance lamp 11, so that when the contact points 8 and 9 make electric connection, a circuit is closed through the battery, the thermostat 3 and the lamp 11. The current flowing through the lamp causes a cooling discharge of the battery to take place. The lighting of the lamps also serves to indicate to an operator that the temperature of the battery is excessively high, so that he can give attention to reducing the same if necessary.

I claim as my invention:

1. The combination of an electric battery, a high resistance circuit connected to said battery, a thermostat connected in said circuit and mounted in one of the cells of said battery and adapted to be heated thereby, and also adapted to close said circuit when said battery reaches a predetermined temperature, whereby the said battery is cooled by the flow of electricity therefrom after said predetermined temperature has been reached.

2. The combination of an electric battery, a heat actuated device positioned adjacent the walls of said battery and adapted to be heated thereby, said device having two electrical terminals; an electric circuit, a high resistance resistor in said circuit, the terminals of said circuit being connected with the terminals of said device; said device being adapted to bring the terminals together when said device reaches a predetermined temperature, whereby said circuit is closed and said battery is cooled by the flow of energy therefrom when said temperature is reached.

In testimony whereof, I hereunto set my hand.

CHARLES E. LINEBARGER.